United States Patent
Faraj et al.

(10) Patent No.: US 9,568,612 B1
(45) Date of Patent: Feb. 14, 2017

(54) 3D IMAGE GENERATION WITH POSITION-SENSING GAMMA PROBE

(71) Applicant: KING SAUD UNIVERSITY, Riyadh (SA)

(72) Inventors: Achraf Al Faraj, Riyadh (SA); Khalid Kezzar, Riyadh (SA); Hamoud Kassim, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/054,042

(22) Filed: Feb. 25, 2016

(51) Int. Cl.
    *G01T 1/16* (2006.01)
    *G01T 1/164* (2006.01)
    *G01T 1/169* (2006.01)

(52) U.S. Cl.
    CPC ............ *G01T 1/1642* (2013.01); *G01T 1/169* (2013.01)

(58) Field of Classification Search
    CPC .................................. G01T 1/16; G01T 17/20
    See application file for complete search history.

(56) References Cited

U.S. PATENT DOCUMENTS

| | | | |
|---|---|---|---|
| 5,763,886 A | 6/1998 | Schulte | |
| 5,813,985 A * | 9/1998 | Carroll | A61N 5/1048 600/1 |
| 5,902,246 A * | 5/1999 | McHenry | A61B 5/1459 250/458.1 |
| 6,236,880 B1 * | 5/2001 | Raylman | A61B 6/4057 600/436 |
| 6,559,440 B2 * | 5/2003 | Yarnall | G01T 1/161 250/252.1 |
| 6,587,710 B1 * | 7/2003 | Wainer | A61B 6/00 250/363.02 |
| 6,602,488 B1 * | 8/2003 | Daghighian | A61K 49/18 424/1.11 |
| 6,906,330 B2 * | 6/2005 | Blevis | G01T 1/1642 250/370.09 |

(Continued)

FOREIGN PATENT DOCUMENTS

EP          1 491 915 A1    12/2004

OTHER PUBLICATIONS

Chiesa et al., Physical Performance Parameters of Intraoperative Probes, 2016, 2. Physical Performance Parameters of Intraoperative Probes, pp. 12 -23.*

*Primary Examiner* — David Porta
*Assistant Examiner* — Djura Malevic
(74) *Attorney, Agent, or Firm* — Richard C. Litman

(57) ABSTRACT

The 3D image generation with position-sensing gamma probe utilizes a gamma probe connected to a control unit. The control unit is also connected to a display unit. A probe contact surface feeds position information to the display unit. The gamma probe is moved across a region of interest over the probe contact surface, generating position-dependent gamma rates with the help of the control unit. The probe contact surface is utilized to determine the position of the probe head and provides position information, which, together with the gamma rate, enables generation of a rate map in the display unit. This allows producing 2D and 3D images of gamma activity concentrations and assures proper recording of scan data. The scanning area of interest is pre-defined by frames having shapes and contours optimized for intended applications. 2D and 3D images can be obtained in a single scanning cycle.

6 Claims, 3 Drawing Sheets

(56) References Cited

U.S. PATENT DOCUMENTS

| | | | | |
|---|---|---|---|---|
| 7,038,205 B2* | 5/2006 | Bushberg | ............. | A61B 6/4258 |
| | | | | 250/336.1 |
| 7,312,460 B2* | 12/2007 | Gerl | ........................ | G01T 1/169 |
| | | | | 250/393 |
| 7,373,197 B2* | 5/2008 | Daighighian | .......... | A61K 49/18 |
| | | | | 250/370.11 |
| 7,576,332 B2* | 8/2009 | Britten | .................... | G01T 1/169 |
| | | | | 250/393 |
| 7,619,199 B2* | 11/2009 | Hirai | .................... | H01J 37/244 |
| | | | | 250/207 |
| 2001/0056234 A1* | 12/2001 | Weinberg | .............. | G01T 1/2985 |
| | | | | 600/436 |
| 2008/0128631 A1* | 6/2008 | Suhami | ..................... | G01T 5/02 |
| | | | | 250/370.09 |
| 2009/0286186 A1* | 11/2009 | Kondoh | .................. | G06F 3/045 |
| | | | | 430/313 |
| 2011/0097133 A1* | 4/2011 | Duru | ...................... | A45D 40/26 |
| | | | | 401/1 |
| 2012/0105058 A1* | 5/2012 | Kopelevitch | ........ | G01R 33/093 |
| | | | | 324/252 |
| 2012/0116720 A1 | 5/2012 | Klann et al. | | |
| 2012/0199753 A1* | 8/2012 | Chuang | ................ | G01V 5/0008 |
| | | | | 250/390.04 |
| 2012/0203213 A1* | 8/2012 | Kimball | ........... | A61B 17/32006 |
| | | | | 606/1 |
| 2013/0172739 A1* | 7/2013 | Paladini | ............... | A61B 6/4258 |
| | | | | 600/436 |
| 2013/0237811 A1* | 9/2013 | Mihailescu | ............ | A61B 5/064 |
| | | | | 600/424 |

* cited by examiner

3D IMAGE GENERATION WITH POSITION-SENSING GAMMA PROBE

BACKGROUND OF THE INVENTION

1. Field of the Invention

The present invention relates to gamma ray imaging devices, and particularly to 3D image generation with position-sensing gamma probe that allows localizing the probe in space relative to the area to be mapped.

2. Description of the Related Art

Gamma cameras are used for numerous applications, including medical diagnosis, pharmacological studies, environmental investigations, industrial quality inspection, and nuclear non-proliferation monitoring. Fundamental science areas, such as atomic and nuclear physics, geology, biology and medicine, rely heavily on gamma imaging probes as well. The drawback of gamma rays as imaging agents is the non-availability of optical lenses for generating focused images.

Thus, 3D image generation with position-sensing gamma probe solving the aforementioned problems is desired.

SUMMARY OF THE INVENTION

The 3D image generation with position-sensing gamma probe utilizes a gamma probe connected to a control unit. The control unit is also connected to a display unit. A probe contact surface feeds position information to the display unit. The gamma probe is moved across a region of interest over the probe contact surface, generating position-dependent gamma rates with the help of the control unit. The probe contact surface is utilized to determine the position of the probe head and provides position information, which, together with the gamma rate, enables generation of a rate map in the display unit. This allows producing 2D and 3D images of gamma activity concentrations and assures a proper record of scan data. The scanning area of interest is pre-defined by frames with shapes and contours optimized for intended applications. 2D and 3D images can be obtained in a single scanning cycle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present invention can comprise software or firmware code executing on a computer, a microcontroller, a microprocessor, or a DSP processor; state machines implemented in application specific or programmable logic; or numerous other forms without departing from the spirit and scope of the present invention described herein. The present 3D image generation with position-sensing gamma probe may utilize a computer program, which includes a non-transitory machine-readable medium having stored thereon instructions that can be used to program a computer (or other electronic devices) to perform a process described herein. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions, data, or the like.

The 3D image generation with position-sensing gamma probe is a system and method to correlate the position of a gamma probe head at any time of a scan with the measured gamma rate, and to generate a map of the rate distribution across the scan points. This allows producing images of gamma activity concentrations and assures a proper record of scan data.

Any gamma probe having at least four gamma detection elements and at least two different distances to the area of interest generating gamma intensity rates may be employed for the present 3D image generation apparatus. Preferably, the probe head containing the gamma detector element has a well-defined tip to accurately place the probe in space. An exemplary gamma detector element arrangement situates one element closest to the tip and the other elements forming a second layer behind. An example for a suitable element arrangement is discussed in expired U.S. Pat. No. 7,312,460, issued to Gerl et al., which is hereby incorporated by reference in its entirety. The main task of a gamma probe is to determine gamma intensity distributions of a target area. This is achieved by slowly moving the probe head across the target area and registering rates and rate changes along the scan paths. Probing different paths and following intensity gradients enables activity concentrations of radiotracers in malignant tissue to be detected.

Figure 1:
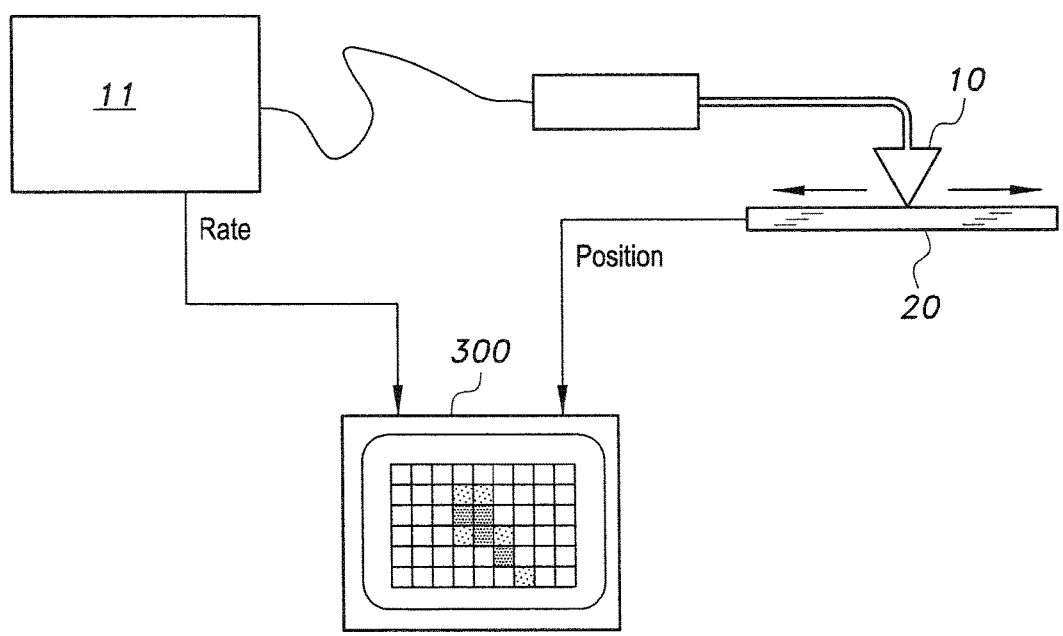
FIG. 1 is a block diagram of a 3D image generation with position-sensing gamma probe according to the present invention.

The present 3D image generation apparatus correlates the position of a gamma probe head at any time of a scan with the measured gamma rate, and generates a map of the rate distribution across the scan points. The image generation and gamma probe device does not require a constant orientation of the probe head with respect to the scanning area. The scanning area of interest is pre-defined by frames defining shapes and contours optimized for intended applications. 2D and 3D images can be obtained in a single scanning cycle. The principle is shown schematically in FIG. 1. A gamma probe 10 is connected to a control unit 11. The control unit 11 is also connected to a display unit 300. A probe contact surface 20 feeds position information to the display 300. The gamma probe 10 is moved across a region of interest over the probe contact surface 20, generating, with the help of a control unit 11, position-dependent gamma rates. The probe contact surface 20 is utilized to determine the position of the probe head and provides position information, which, together with the gamma rate, enables generation of a rate map on the display 300.

Generating a map of the gamma intensity for the measured positions requires the following steps. The position coordinates are first calibrated. The mean orientation corrected probe rate and mean position for a preferred measurement time interval are calculated. The statistical uncertainty of the mean count rates for each position is calculated. The coordinates, rates, and rate uncertainties are recorded into a map for later retrieval and documentation.

Figure 2:
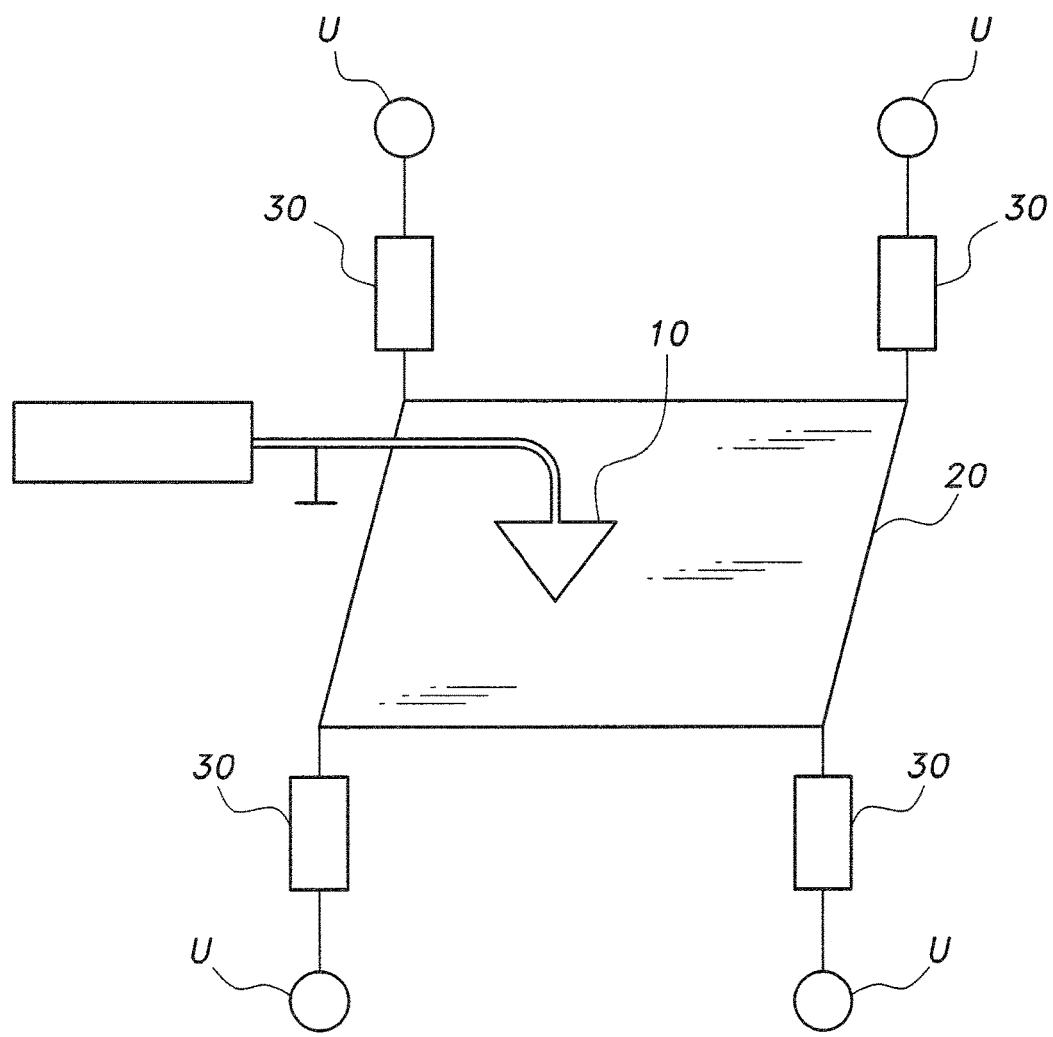
FIG. 2 is a pictorial schematic diagram showing positioning of end resistors on the resistive foil corners of the position-sensing surface for 3D image generation with position-sensing gamma probe according to the present invention.

The probe contact surface 20 may be a resistive foil, the location of the probe head tip being determined by measuring its coordinates with the resistive foil. For example, the resistive foil can be made of transparent polyethylene terephthalate (PET) plastic material with a resistive indium-tin oxide (ITO) coating. In the example shown in FIG. 2, the foil probe contact surface 20 has a rectangular shape and is electrically connected to a common reference voltage via four resistors 30 at the corners. In this example, the tip of the probe head 10 is made electrically conducting and is put to ground potential via an electrical connection leading from ground (ground lead) to the probe tip. The tip may be implemented as a small metal ball in a bearing to minimize the wear of the resistive coating of the foil. Touching the resistive layer of the probe surface 20 with the tip of the probe 10 results in characteristic voltage drops across the resistors 30, which uniquely define the coordinates of the tip of probe 10 on the foiled probe contact surface 20.

The voltage drop across the corner resistors 30 may be measured at terminals U with analog-to-digital converters (ADCs), and the digitized values may be read and processed by an attached computing device, e.g., a laptop computer. The same computer may read the rate information of the probe via a communication interface.

Placing the foiled probe contact surface 20 such that it covers the target area to be examined allows correlating the observed probe rate with the corresponding position. Elasticity allows the foiled probe contact surface 20 to follow the contour of the part of the body being examined. If a flat surface is desired, the foil can be stabilized by a rigid flat holding frame. The frame may also provide mechanical protection to the electrical corner contacts U. For investigation of the thyroid, it may be advantageous to lay the foil around the neck of the patient. For such applications, custom-made rigid frames defining non-flat shapes, e.g. half-tubes, can also be used. If, for a particular examination, the foil is required to rest fully on the body surface, a flexible frame is a possible choice.

One simple way to fix the frame with the foiled probe contact surface 20 to the body of the patient is the use of adhesive tape. Taking a photograph of the assembly for recording the examination and marking the corner points or the circumference of the foil on the skin of the patient with a marker helps to locate suspect points, e.g. for a directly following surgical intervention. Additionally, a grid may be printed on the foiled probe contact surface 20 to assist localization.

For convenience, the digitized values of the measured resistor voltages are converted into position coordinates by the computer 11. This may be achieved by a suitable algorithm, linearizing the voltage values and converting them to length units. Another preferred possibility is to compare the voltage values with previously measured values for well-defined positions stored in a database.

The ADC measurement frequency is made identical to the rate measurement frequency of the probe 10. Then, for each obtained gamma rate, a pair of x-y coordinates is available. Generally, the measurement time of the probe will be related to the obtained count rate, which is chosen such that the statistical accuracy of the accumulated counts is sufficient to realize relevant activity variations of the target area. The time needed to measure the voltages of a tip position is usually much shorter. Therefore, it can be advantageous to measure the position repeatedly within the gamma rate measurement interval, and to calculate the mean value of the position measurements. Moreover, information about the speed and direction of the probe movement could be determined and employed for further analysis steps.

The correlated coordinate and rate information may be stored, measurement by measurement, in the memory of the computer 11. Employing well-known methods and apparatus, this information can be archived and retrieved for later inspection. Moreover, an image of the rate distribution over the area of interest can be generated.

In a simple realization of the present 3D image generation apparatus, a two-dimensional mapping array representing the positions is defined, and for each measurement, the rate value is stored in the corresponding pixel of the array. Variations of the inclination angle of the probe head with respect to the area of interest in the course of scanning are apparent in the rate pattern of the second layer detector elements, and can be corrected before storing the rate of a position in the array. The ratio of the rate of the front detector to the sum of the rates of the second layer detectors depends on the depth of the gamma radiation source. Assuming simple geometries for the source distribution, the mean depth can be either calculated analytically or obtained by a comparison with a pre-measured database. An asymmetry parameter may be calculated from the relative amplitudes of the detection elements. A rate correction factor may be derived and applied from the asymmetry parameter. If a position is measured more than once, the mean value of the measurements is calculated and stored. The contents of the mapping array can be visualized on a display, e.g., the screen of the laptop, thus generating an image of the rate distribution of the area of interest. If desired, different rate values may be displayed with different pixel colors, while positions not measured may be displayed in grey. The color scale increments may be adjusted to the statistical accuracy of the measurements to avoid misinterpreting statistical fluctuations as true activity variations. Similarly, a mapping array for the depth values can be generated and visualized. Moreover, a map of the gamma source depth for the measured positions can be generated. A depth parameter is calculated from the relative amplitudes of a plurality of detection elements. A mean depth value is derived and applied from the depth parameter. The systematic and statistical depth uncertainty for each position is calculated. The coordinates, depths and depths uncertainties are then recorded into a map for later retrieval and documentation.

State-of-the-art imaging techniques enable real-time displays, assisting the operator of the probe in completing the map to the needed degree of accuracy and area coverage. The visualization helps also to avoid unintentionally left out regions. On the other hand, the procedure may provide in a short time all interesting image features without the necessity to scan all positions within the frame.

Figure 3:
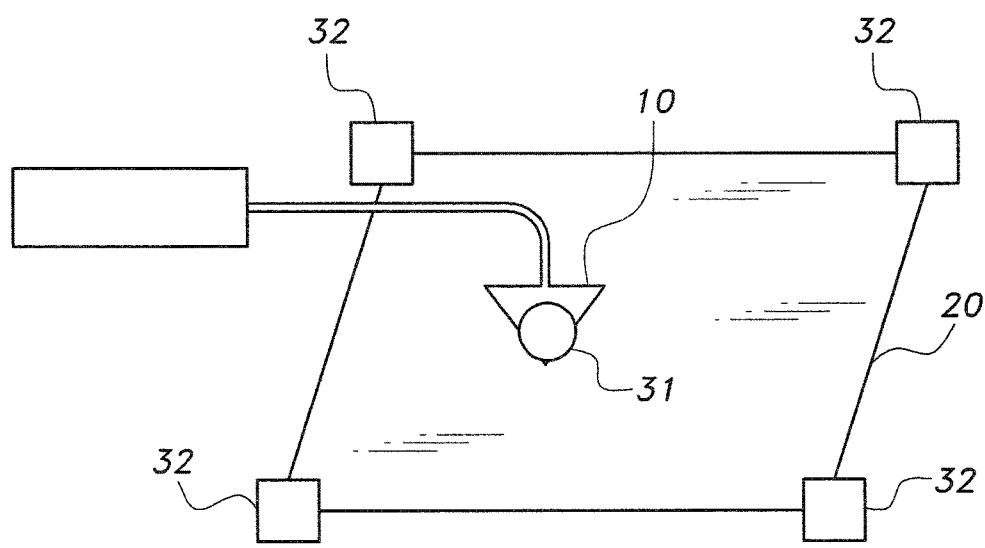
FIG. 3 is a schematic diagram showing a magnetic sensor disposed on a gamma probe in 3D image generation with position-sensing gamma probe according to the present invention.

In the embodiment depicted in FIG. 3, position sensing is achieved by a multitude of magnetic field sensors 32 distributed along the edges of the intended area of interest to be examined as defined by the probe contact surface 20. As shown in FIG. 3, four sensors 32 are disposed in respective corners of the rectangular-shaped probe contact surface 20. The shape of the probe contact surface 20 need not be rectangular. Custom-shaped areas, such as circular surfaces, can be conveniently realized with sensors placed along the periphery. To obtain the position of the probe 10, a permanent magnet or electromagnet 31 is mounted near or at the tip of the probe 10. The size and position of the magnet 31 have to be chosen such that magnet 31 does not significantly absorb or scatter the gamma radiation to be detected with the probe 10.

When positioning the head of the probe 10 inside the area delimited by the magnetic field sensors 32, their measured field strengths uniquely define the position of the tip of probe 10. Appropriate signal amplifiers and ADCs are used to process the sensor data. Similar to the case of the resistive foil, the digitized values are converted into length units with proper algorithms or a database. All further details can be identical to the resistive foil embodiment described above.

The magnetic field method is contactless, which might be advantageous for some applications. However, to obtain accurate results still requires the gamma probe head to be operated on a well-defined surface. Incorrect measurements, e.g., lifting the head of the probe 10 while measuring, can be recognized by unbalanced magnetic field readings of the sensors 32. Persons skilled in the art can easily find appropriate algorithms for that purpose. If the distance to the surface is small, measured rate deviations may be corrected by software. Another possibility is rejecting suspicious measurements, which can be accompanied with an acoustical or optical warning.

It is to be understood that the present invention is not limited to the embodiments described above, but encompasses any and all embodiments within the scope of the following claims.

We claim:

1. A 3D image generation system adapted to correlate the position of a gamma probe head at any time of a scan with the measured gamma rate to generate a map of the rate distribution across scan points, the 3D image generation system comprising:
   a gamma probe, the gamma probe having a probe head, the gamma probe adapted to determine the gamma intensity distributions of a target area;
   a frame having a periphery defining a plurality of corners;
   a position sensor producing electrical signals having values uniquely corresponding to the position of a preferred point of the gamma probe within a defined geometrical area of interest bounded by the periphery of the frame;
   a signal conditioning processor having an input accepting the electrical signals from the position sensor and having means for generating an output of corresponding position coordinates;
   a gamma radiation detector having a plurality of detection elements disposed on the gamma probe at varying distances with respect to a detection target, the detection elements responding to varying gamma probe rates;
   a first processor having means for correlating the position coordinates and the gamma probe rates corrected for probe head orientation variations;
   a second processor having means for obtaining target depth information from relative gamma probe rates of the plurality of detection elements;
   memory connected to the first and second processors, the memory storing indicia of radiation strength corresponding to the correlated position coordinates, gamma probe rates, and target depth information;
   a display rendering in a single scanning cycle the stored indicia as a rate map image viewable by a user;
   a ground lead connected to a tip of the probe;
   a resistive foil attached to the frame and spanning the area bounded by the frame periphery, the resistive foil transmitting probe head position when the tip of the probe touches the resistive foil in electrical contact with the resistive foil;
   a resistor disposed at a respective peripheral corner of the frame, each of the resistors having a first terminal in electrical contact with the resistive foil and a second terminal for transmitting the probe head position.

2. The 3D image generation system according to claim 1, further comprising:
   a plurality of magnetic field sensors placed along the frame periphery; and
   a magnet attached to the probe head, signals generated by the magnetic field sensors when the probe head is disposed within the bounded area indicating the position of the probe head.

3. The 3D image generation system according to claim 1, further comprising a printed grid disposed on the resistive foil, the printed grid aiding location of suspect points for surgical intervention.

4. The 3D image generation system according to claim 1, wherein the resistive foil comprises:
   transparent polyethylene terephthalate (PET) plastic material; and
   a resistive indium-tin oxide (ITO) coating disposed on the PET plastic material.

5. The 3D image generation system according to claim 1, wherein the frame is resiliently flexible.

6. The 3D image generation system according to claim 4, further comprising:
   a bearing;
   a metal ball disposed in the bearing, the ball and bearing combining to form the tip of the probe for minimizing wear of the resistive coating of the foil when the probe is in contact with the foil.

* * * * *